US008411323B2

(12) United States Patent
Le Glaunec et al.

(10) Patent No.: US 8,411,323 B2
(45) Date of Patent: Apr. 2, 2013

(54) METHOD FOR GENERATING PRINT DATA AND A COLOR PRINTER SYSTEM

(75) Inventors: Vincent Jean-Marie Noël Le Glaunec, Vertou (FR); Christophe Antoine Leynadier, Maison Alfort (FR); Philippe Jean-Michel Sobczak, Alfortville (FR)

(73) Assignee: OCE Technologies B.V., Venlo (NL)

( * ) Notice: Subject to any disclaimer, the term of this patent is extended or adjusted under 35 U.S.C. 154(b) by 0 days.

(21) Appl. No.: 13/480,654

(22) Filed: May 25, 2012

(65) Prior Publication Data

US 2012/0243051 A1 Sep. 27, 2012

Related U.S. Application Data

(63) Continuation of application No. PCT/EP2010/068198, filed on Nov. 25, 2010.

(30) Foreign Application Priority Data

Nov. 26, 2009 (EP) .................................... 09306143

(51) Int. Cl.
*G06K 15/00* (2006.01)
*H04N 1/60* (2006.01)
(52) U.S. Cl. ......................................... 358/2.1; 358/1.9
(58) Field of Classification Search .................. 358/2.1, 358/1.9; 382/118, 190, 291
See application file for complete search history.

(56) References Cited

U.S. PATENT DOCUMENTS

| 7,684,594 | B2 * | 3/2010 | Ioffe ............................. 382/118 |
| 2005/0163385 | A1 | 7/2005 | Thakur |
| 2007/0025627 | A1 | 2/2007 | Hasegawa et al. |
| 2008/0075364 | A1 | 3/2008 | Speigle et al. |

OTHER PUBLICATIONS

Form PCT/ISA/210 for PCT/EP2010/068198 dated Feb. 9, 2011.
Form PCT/ISA/237 for PCT/EP2010/068198 dated Feb. 9, 2011.

* cited by examiner

*Primary Examiner* — Charlotte M Baker
(74) *Attorney, Agent, or Firm* — Birch, Stewart, Kolasch & Birch, LLP (57) ABSTRACT

A method for generating print data for digital color images uses a division of the images in windows. Each window is characterized as belonging to a predefined class, based on values of pixels in corresponding windows in at least two sub-images that are derived from the color image by a series of image processing steps. These sub-images are, e.g. a gradient sub-image in which the value of every pixel indicates the difference of that pixel with its local neighborhood and a non-uniformity sub-image in which each pixel determined to be comprised in a uniform area is provided with a predetermined value. The percentage of windows belonging to a class is calculated and compared to threshold values to identify an image type. This image type is used to select a conversion method to convert the color image into print data for printing on the printer system.

9 Claims, 6 Drawing Sheets

METHOD FOR GENERATING PRINT DATA AND A COLOR PRINTER SYSTEM

CROSS-REFERENCE TO RELATED APPLICATIONS

This application is a Continuation of PCT International Application No. PCT/EP2010/068198, filed on Nov. 25, 2010, and for which priority is claimed under 35 U.S.C. §120, and which claims priority under 35 U.S.C. §119 to European Application No. 093606143.0 filed on Nov. 26, 2009. The entirety of the above-identified applications is expressly incorporated herein by reference.

BACKGROUND OF THE INVENTION

1. Field of the Invention

The present invention relates to a method for generating print data for a digital color image having pixels, the method comprising the steps of determining for each pixel in the digital color image a value of a characteristic feature, and selecting an available conversion method for processing the pixels of the digital color image into print data, based on the determined characteristic values of the pixels. The present invention further relates to a color printing system comprising a controller for scheduling and interpreting print jobs and a printing process for marking support material, the controller comprising modules for generating print data for a digital color image having pixels.

2. Background of the Invention

In the state of the art, color printer systems are applied for producing high quality reproductions of images on a receiving material. These images exist in the form of a digital representation and originate from a computer application, from a camera, from a scanner, or any other source. At the time of reproduction, the images are prepared to be part of a print job that is sent to the printer system. The printer system comprises a printing engine and a controller for scheduling and interpreting print jobs. In the controller, an image of a print job is converted to print data that is sent to the printing engine for marking the receiving material. A printing engine comprises, e.g. an electrophotographic process, wherein an illumination system is used to imagewise discharge a charged photoconducting material. Thereafter the photoconducting material is developed by dry colored powder, which is transferred to the receiving material. Another printing engine comprises an inkjet process in which inkjet heads release imagewise small ink drops of various colors from nozzles on a side of the printhead where the receiving material is brought close to. In support of each printing process, the image is converted in a number of processing steps to print data that is suitable for the printing process. This is called a conversion method and comprises, e.g. background reduction, to reduce the amount of ink or toner that is rendered in the background of the information in the image, contrast enhancement, to accommodate the contrast in the image to the contrast that is available with the toner or ink on the receiving material, filtering for sharpness improvement and prevention of moiré, halftoning for deciding where the dots that form the reproduction of the image on the receiving material are placed and print strategy masking, which is used to determine which pixel positions are printed at which printing process pass. These processing steps are well known in various forms.

A color printer system as indicated is capable of processing and printing many kinds of color images. Some of the images have only lines and text on a white background; other images comprise photographic images or maps. Maps comprise images that have text on a colored background. If the image does not have pixels, the digital representation of the image is processed to a pixel-based digital representation. Each pixel is characterized by a combination of numbers for a number of channels. In one case, each pixel is characterized by three numbers, one for the amount of red in the R-channel, one for the amount of green (G-channel) and one for the amount of blue (B-channel). In another case, each pixel is characterized by four numbers for cyan, magenta, yellow, and black. In each case, the combination of numbers for the channels is called the value of the pixel. It has been found that each type of image has an optimal conversion method for generating print data. Therefore, it is advantageous to select the appropriate conversion method for an image of a defined type. Usual image types include 2D CAD, which comprise line drawings and text, 3D CAD/maps, which comprise business graphics, model drawings and geographic maps, and photographic images, which comprise images with real-life scenes.

In the current state of the art, the user of the print system is asked to select a conversion method for a print job. If the print job comprises only one image type, the most appropriate one may be selected, assuming the user is aware of the possibilities of the printer system. In mixed print jobs, which comprise various image types, the user has the choice to either use a print conversion method that is suboptimal for some of the images in the job, or to split the print job into several print jobs, each involving a single type of image.

In U.S. Patent Application Publication No. 2005/0163385, a method is described to classify images using a concentration ratio, which is compared to one or more classification thresholds. This concentration ratio is determined from histogram data of the lightness of the pixels in the image. The classification can be used to select appropriate settings, i.e. the appropriate conversion method, for printing the image. However, the latitude of this method is rather limited, since all characteristic features of the image are expressed in one number.

SUMMARY OF THE INVENTION

The goal of the present invention is to automatically select the optimal conversion method for generating print data for an arbitrary image in a print job. The present invention reaches this goal by adding to the method the steps of deriving from the digital color image at least two sub-images, in each of which the pixels have a value that represents another characteristic feature of the pixels in the digital color image, establishing a class for each pixel in the digital color image by combining the at least two values of the corresponding pixels in the sub-images, and selecting a conversion method based on a statistic of classes of the pixels in the digital color image. A characteristic feature of the pixels comprises the lightness of the pixel, its colorfulness, its similarity to other pixels in the direct environment, etc. A class of a pixel indicates a most probable kind of pictorial surrounding the pixel is an element of. Such a class may be a white uniform area, a colored uniform area, a photograph, or a line. This last class comprises text elements.

At least two sub-images are obtained by processing the digital color image by state-of-the-art image processing methods. This has the advantage that characteristic features of the image in at least two dimensions are used to determine the image type. A sub-image, which usually comprises one channel, is an image of the same size as the original image, having pixels that have values that are mathematically derived from the values of the pixels in the original image or in other sub-images and that indicate a feature of pixels on a corresponding position in the original image. Such a feature may be a lightness, indicating the perceived amount of light at the position of the pixel, a gradient, indicating a change in the pixel value at the position of the pixel, or a quantized part of the pixel value at the position of the pixel.

In a further improved embodiment of the method according to the present invention, the at least two sub-images comprise a gradient sub-image, in which each pixel indicates a local variation in a value of a pixel relative to a value of at least one pixel located in a neighborhood of said pixel, and a non-uniformity sub-image, in which each pixel determined to be comprised in a uniform area is provided with a predetermined value.

When making a histogram of values that occurs for pixels in the digital color image, the relation between a pixel value and the values in the immediate surroundings of the pixel is lost. Therefore, a number of pixels representing a local, uniform background is not distinguished from a similar number of pixels having the background value that are scattered all over the image. From experiments, it shows that the latitude of the method increases when pixels in uniform areas, such as background for text, are provided with a predetermined value to obtain a non-uniformity sub-image. Another example of a sub-image is a gradient sub-image, in which each pixel indicates a local variation in a value of a pixel relative to a value of at least one pixel located in a neighborhood of said pixel. A gradient sub-image indicates the fluctuations in pixel value, which are usually high for pictorial surroundings and low for surroundings with uniform areas.

In a further embodiment, the digital color image is divided into a number of windows, each window comprising a number of pixels. In this way, the amount of memory and the processing time can be adjusted to the availability of these resources. A window in image processing is a connected area of pixels from the set of pixels of an image. Especially large images, comprising more than 100 million pixels, are processed in a reasonable amount of time using windows. In the sub-images, corresponding windows are determined. The class of a window in the digital color image is established by combining average values of the pixels in corresponding windows of the at least two sub-images. The class of a pixel equals the class of a window that comprises the pixel. The use of corresponding windows in the sub-images also has the advantage that fluctuations in the attribution of classes to pixels are reduced, because the values of several pixels are combined to establish a class.

In a further embodiment, the number of windows for each class relative to the total number of windows is determined. This fraction is compared to a threshold to classify the digital color image as a type of image for which a conversion method is selected. It is possible to overrule this automatic selection of an image type, but in usual circumstances it is convenient to have the digital color image automatically classified before the printing starts. With the selection of an image type, a conversion method is enclosed.

In a further embodiment, a learning mode is provided in which an original type is defined and a number of preselected images are processed in order to establish thresholds to which the percentages of occurring classes are compared. If, for example, a number of images is processed, which are CAD-drawings with lines, most of the windows belong to the class of white uniform area and some to the class of lines. The thresholds will be chosen in such a way that for each class, the percentages of windows of the preselected CAD-drawings fall within a range limited by the thresholds. A number of original types is predefined, and the conversion methods are fixed, but the user may also be able to define its specific original type and its corresponding conversion method, using the learning mode to set the thresholds for this image type.

The present invention is also embodied in a color printer system, comprising a controller for scheduling and interpreting print jobs and a printing engine for marking support material, the controller comprising modules for generating print data for a digital color image having pixels by adding at least two modules for processing the digital color image into sub-images, a module for establishing a class for each pixel in the digital color image by combining the at least two values of the corresponding pixel in the sub-images and a module for selecting a conversion method based on a statistic of classes of the pixels in the digital color image. The controller can handle mixed print jobs without interaction of the user and select the optimal module for generating print data for each image in the print job.

Further embodiments comprise modules that are enabled to perform the methods that are described earlier. These modules may refer to implementations that are primarily software based for general purpose hardware, or to implementations that use special purpose hardware for fast execution of the methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements are identified with the same reference numeral.

Figure 1:
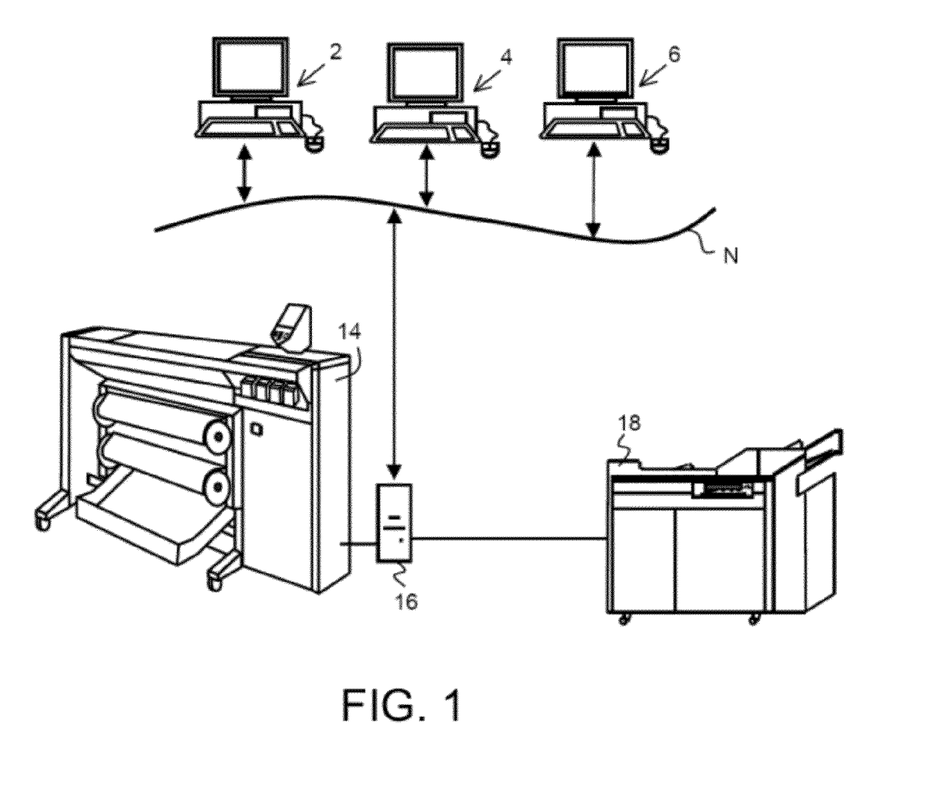
FIG. 1 is a color printing system in which the method is applicable.

The color printing system of FIG. 1 comprises a wide format ink jet printer (14) and a document printer (18) for office size print output. For both type of printers the print data is generated by a controller (16) that is connected to a network (N). It is equally well possible to have two controllers, one for each printer. Access to this network is made by computers of all kind, such as personal computers, workstations, servers etc., also designated as client computers (2, 4, 6). Not shown is a scanner that converts hardcopy originals into digital color images that may be part of the system. The digital color images, that are part of a print job, are sent to the controller via the network to be printed on one of the available printers. The controller uses a method of the present invention to classify the digital color image and to select the appropriate conversion method for generating the print data.

Figure 2:
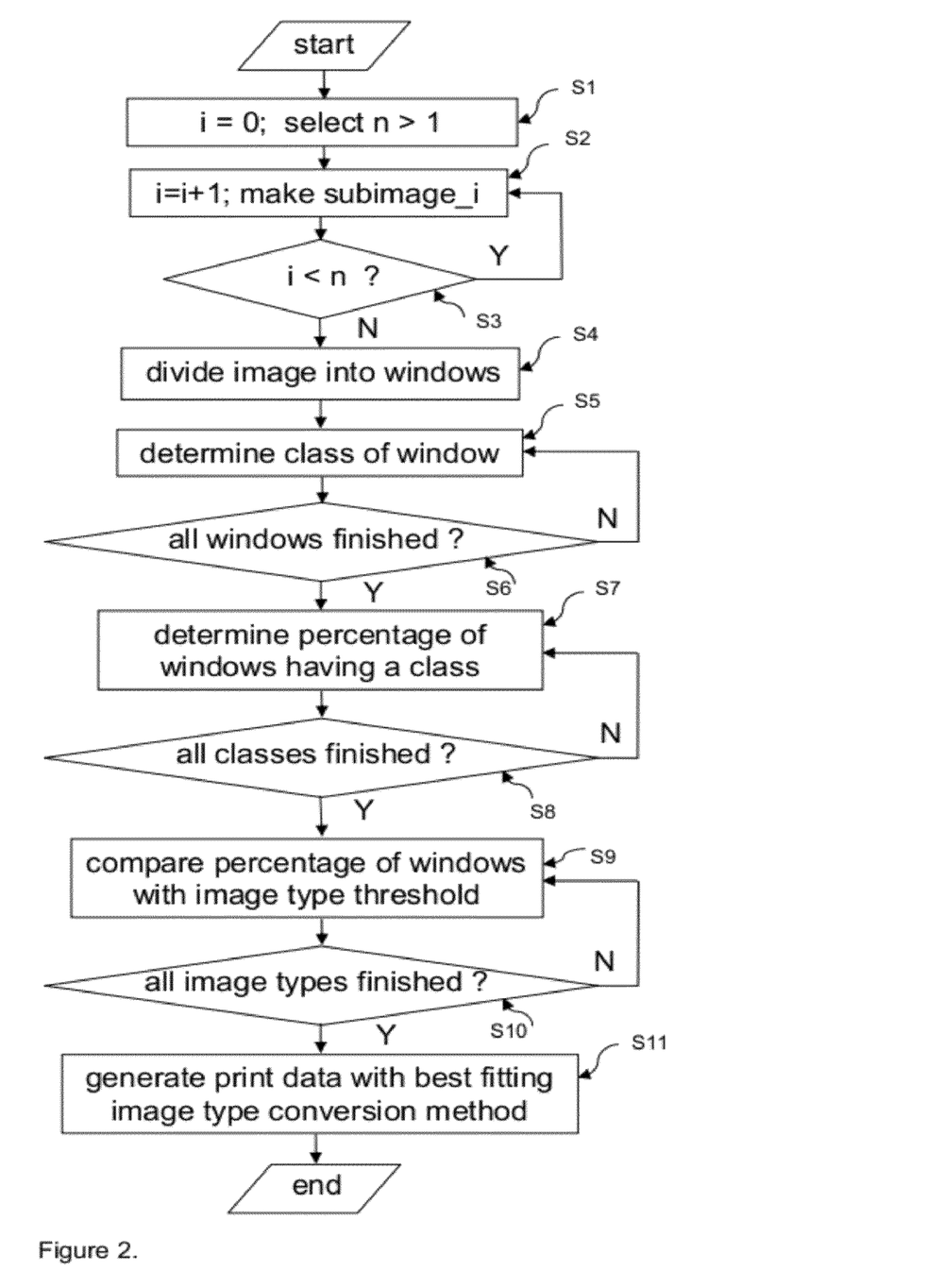
FIG. 2 is a flow chart that shows the various steps in the image processing method.

The flow chart in FIG. 2 shows the steps of a preferred embodiment of the invention: first a decision is made about the number of sub-images that is generated (S1). At least two sub-images are used. These sub-images are generated using known methods (S2), until all sub-images are available (S3, "N"). In an embodiment, two sub-images (n=2) are deduced from the digital image. In one sub-image, called a gradient sub-image, the value of the pixel, comprising one channel, is indicative for the local variation in the lightness of the pixel in the digital image (cf. FIG. 3). In a second sub-image, called a non-uniformity sub-image, the value of the pixel is indicative for the feature that the pixel in the digital image is comprised in a uniform area, whether colored or white (cf. FIG. 4). For a reproduction, white means that no ink or toner will be deposited for that pixel. If not all sub-images are generated, the branch marked "Y" will be followed back to step 2 (S2). In step 4, the images and sub-images are divided into windows of about 10 to about 30 pixels in both directions (S4). An average value of the pixels of each window of each sub-image is calculated and arranged in one of three levels: "low", "medium", or "high". This results in nine possible combinations of values of windows in the sub-images. For all these combinations, a class is established. For example, a combination of a low gradient value and a high gradient value in the non-uniformity image indicates a window with primarily uniform area pixels. On the other hand, a combination of a high gradient value and a low gradient value in the non-uniformity image indicates a window with primarily photographic pixels. This step of determining a class for each window (S5) is repeated until all windows are finished (S6: Y). Then, the fraction of windows of each class is determined (S7). When this has been carried out for all classes (S8: Y), these fractions are compared to the thresholds (S9) that are related to an image type with a corresponding conversion method. When all comparisons have been executed (S10: Y), one of the image types is selected (S11) and the method ends.

Figure 3:
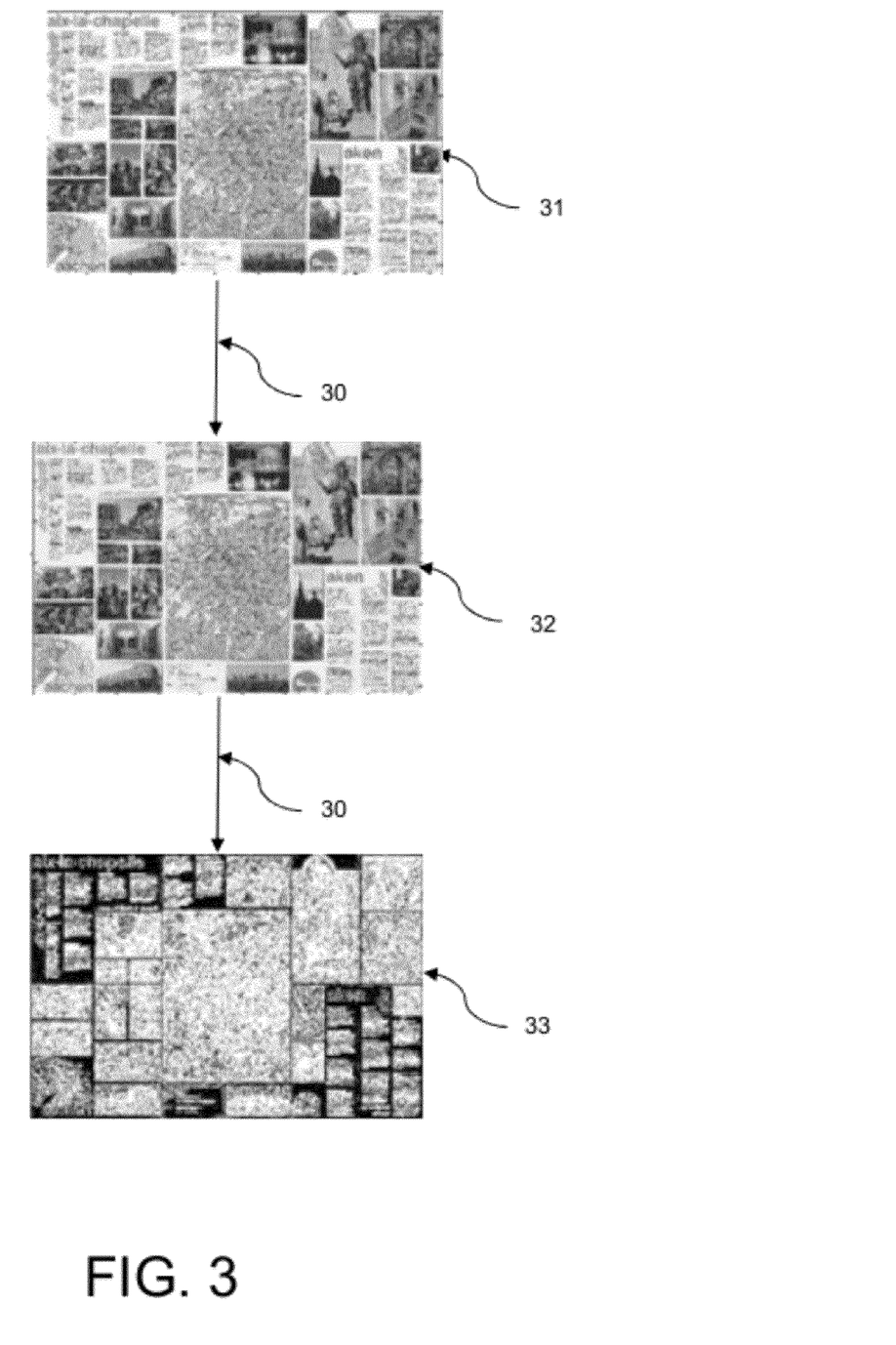
FIG. 3 is a number of reduced images that indicate how a gradient sub-image is derived from the original digital color image.

FIG. 3 shows a number of reduced images, representing an original image (31), a lightness sub-image (32), and a gradient sub-image (33). These sub-images are derived by conventional image processing steps (30). The pixels in the original image are characterized by three numbers for the channels R, G, and B to indicate a colored picture element. However, other channels may also be used to indicate a color. From these numbers, a lightness, L, is deduced, e.g. by linearly combination:

$$L=(5R+9G+2B)/16$$

However, there are many other ways to deduce the lightness, including non-linear transformations. Making a new sub-image in which every pixel has the value of the lightness of the corresponding pixel in the original image is a common procedure in image processing. The lightness sub-image has only one channel. From the lightness sub-image a gradient sub-image is derived by applying a high-pass filter, such as a filter characterized by the kernel $$\begin{pmatrix} 0 & -1 & 0 \\ -1 & 4 & -1 \\ 0 & -1 & 0 \end{pmatrix}$$

indicating that for every pixel a value is calculated that equals four times the present value minus the value of the neighboring pixel above, under, to the left and to the right. In a homogeneous part, all pixels have the same value and the resulting value will be zero. In the gradient sub-image, this is shown as black. If the indicated pixels have different values, the resulting value will be unequal to zero. The resulting value is limited to fall in a predetermined range from zero (black) to a maximum value (white). Noise in the image may lead to small resulting values, indicating small gradients, which are to be discarded.

Figure 4:
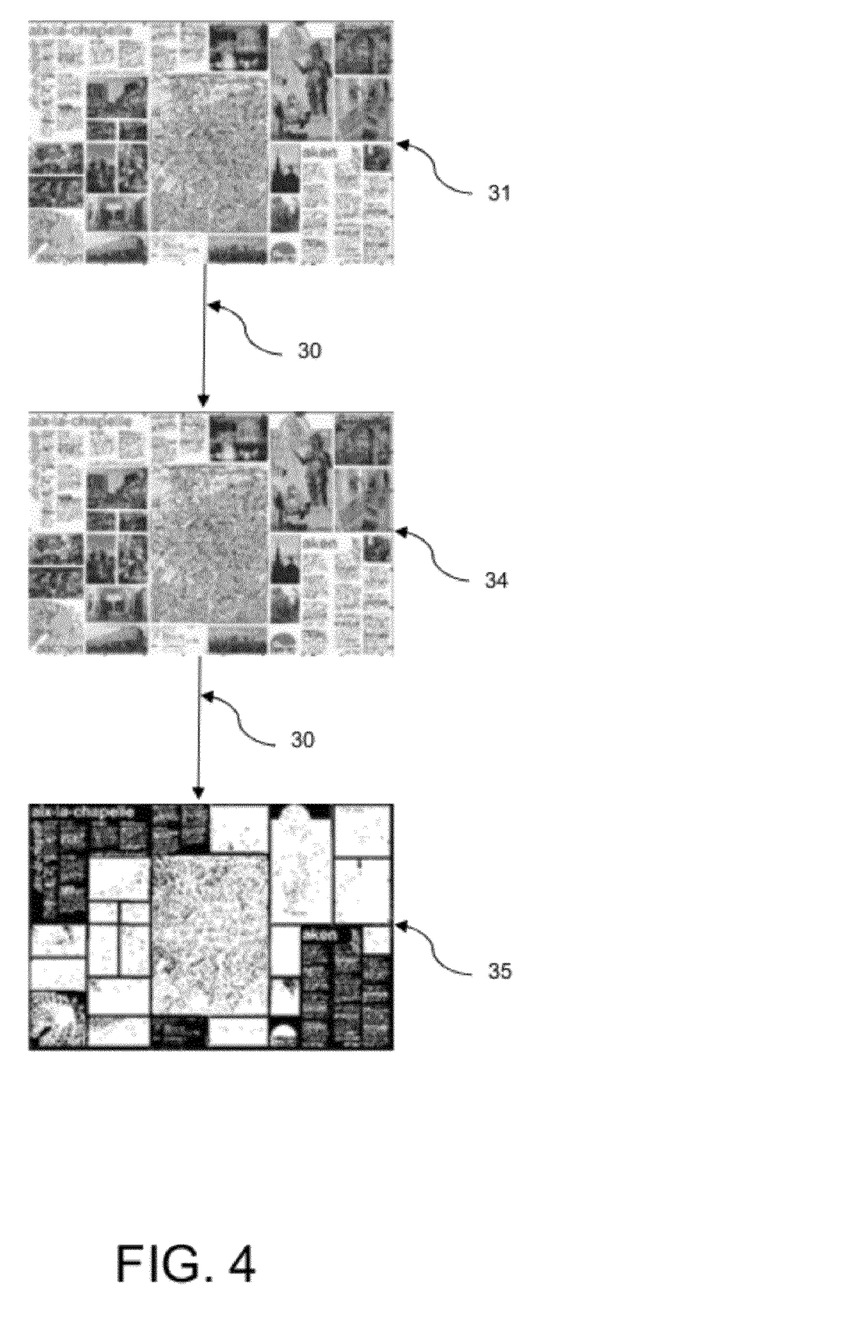
FIG. 4 is a number of reduced images that indicate how a non-uniformity image is derived from the original digital color image.

In FIG. 4, a similar sequence of reduced images is shown, where the image processing deduces from the original image (31) a quantified sub-image (34) and subsequently a non-uniformity sub-image (35). The first step comprises the reduction of the available color values of the pixels. In the original image, every pixel is characterized by three numbers, ranging from 0 to 255. Therefore $256^3$=16,777,216 possible combinations exist. Each combination indicates a different color, although some of these colors will be indiscernible upon rendering. In the quantified sub-image, every number is rounded to a multiple of 16, reducing the number of colors to $16^3$=4096. When rendered, all of these colors will be discernible. However, in areas where the color changes gradually, contours will be visible. A histogram of the colors in the quantified sub-image is made to obtain the occurrence frequency of each color. The color having the highest frequency is selected. The pixels having the selected color are subjected to an opening operation. This is a morphological operation comprising an erosion and dilation operation that are executed in that order. The first operation, erosion, is generally used to remove the outer pixels of a set of pixels, and in this case removes the pixels of the selected color that have a neighboring pixel that is not of the selected color. The second operation, dilation, adds four neighboring pixels to a pixel of the selected color. As a result of the two operations, uniform areas of the selected color will lose the pixels on the edge of the area in the erosion operation, but these pixels will largely be restored by the dilation operation. Therefore, the ratio between the number of pixels before the opening operation and the number of pixels after the opening operation will be close to one. In contrast, if the pixels of the selected color occur in a scattered way in the image, many pixels of the selected color will disappear in the erosion operation, since they frequently have a neighboring pixel of a different color and these pixels will not reappear by the dilation operation. Therefore, the ratio mentioned above will in this case not be close to one. In this way, a distinction is made between colors that occur in uniform colored areas and colors that occur in scattered pixels. To compose a non-uniformity sub-image, the pixels that belong to a uniform area are given the value 0, which corresponds to black in the reduced image (35) of FIG. 4. These pixels are found by selecting pixels that belong to the frequently occurring colors in uniform colored areas, and find the corresponding pixels in the gradient sub-image. If this gradient is below a threshold, the pixel in the sub-image is given the value 0. The other pixels in the non-uniformity sub-image are given the maximum value, usually 255, which corresponds to white in the reduced non-uniformity sub-image (35). Pixels occurring in pictures in the original image will often have non-frequently occurring colors, and if they have frequently occurring colors, the pixels will be scattered. Therefore, the corresponding pixels in the non-uniformity sub-image will often have the maximum value.

An alternative way to make a non-uniformity sub-image, which is executed much faster, is found in selecting the most frequently occurring color and computing an average value of the gradient of the pixels that have that color in the quantified sub-image. If this value is lower than a threshold, the pixels of the selected color belong to a uniform area and are made black in the non-uniformity sub-image. Otherwise they are white.

In both methods, to compose a non-uniformity sub-image, the image may be processed in bands. The most frequently occurring color is then calculated for each band and the uniform area determination is performed for the selected color of the current band and for the selected colors of neighboring bands. In this way, the image can be processed more efficiently without having the complete image available in memory.

Figure 5:
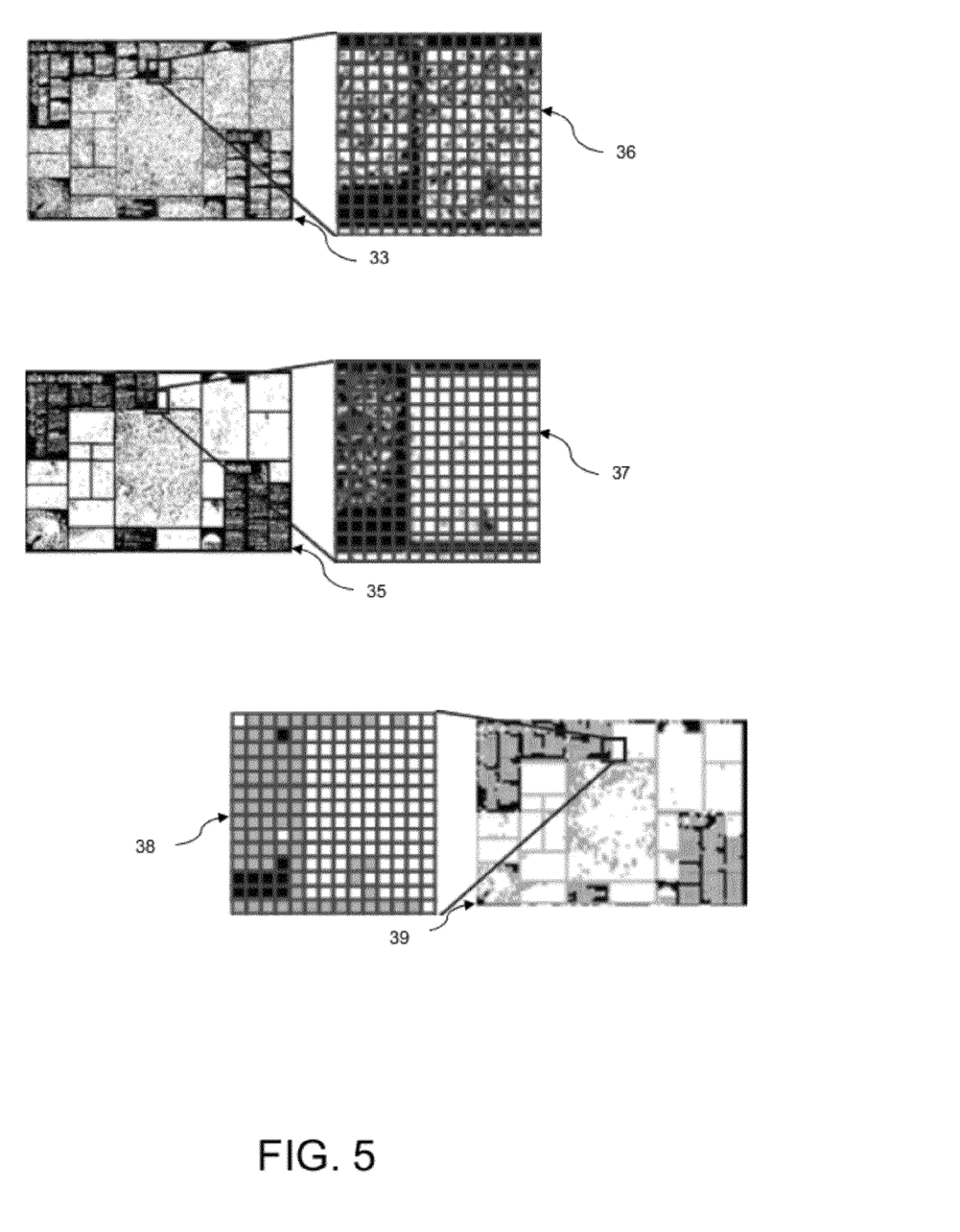
FIG. 5 is the division of the image in windows and the analysis of the windows in various classes.

FIG. 5 shows the division of the gradient sub-image (33) and the non-uniformity sub-image (35) into corresponding windows of pixels. An enlarged part of the sub-images (36, 37) shows the individual windows comprising about 20 pixels in both directions. An average value of the pixels within each of the windows is determined and compared against the thresholds LNU, HNU, and TG. LNU indicates a low threshold for the non-uniformity sub-image and has a value of about 15, HNU indicates a high threshold for the non-uniformity sub-image and has a value of about 175, and TG indicates a threshold for the gradient sub-image and has a value of about 25. The values of these thresholds refer to the situation in which the values in the sub-images range from 0 to 255. For each window, a class is established according to the following table:

TABLE 1

Division of the classes uniform, line/text or photo depending on the averages of the values of pixels within the windows of the sub-images.

| average on window in non-uniformity sub-image (a1) | average on window in gradient sub-image (a2) | |
|---|---|---|
| | a2 < TG | TG ≦ a2 |
| a1 < LNU | uniform | photo |
| LNU ≦ a1 < HNU | line/text | line/text |
| HNU ≦ a1 | uniform | photo |

After establishing a class for each window, a segmented sub-image (39) is obtained with every window in the class "photo" having a white color, every window in the class "line/text" having a gray color and every window in the class "uniform" having a black color, as shown in the enlarged part of the sub-image (38).

If a window is established as a uniform area, an average value of the pixels in the corresponding window of the original image is used to distinguish a white uniform window from a colored uniform window. Therefore, four classes of windows, representing the dominant type of pixels, are discerned. The relative frequency of the occurrence of the class of the windows is used to determine an original type and the corresponding conversion method. In the case of the image of FIGS. 3, 4 and 5, it was found that 11% of the pixels belong to the class of uniform white area, 3% of the pixels is of the class uniform colored area, 37% of the pixels is line/text, and 49% of the pixels is photo.

By supplying a number of test originals for which an image type has been determined, the criterions as given in Table 2 were derived.

TABLE 2

Criterions to classify an image into one of four image types for which corresponding conversion methods have been established. The class relative frequency is the number of pixels which fall in a class. The criterions are successively checked with an 'AND' relation for the limits listed in a row. If no limit is given for a class, any percentage will do. Several rows refer to one image type. When no distribution of classes as given fits the distribution for an original image, the image will be printed as having a mixed content.

| | class relative frequency | | | |
|---|---|---|---|---|
| image type | photo | white uniform | colored uniform | line/text |
| photographic image | >65% | | | |
| | >30% | <50% | | <30% |
| | >20% | | >35% | <30% |
| | >18% | <50% | | <25% |
| 2D CAD/lines/text | <10% | >65% | | |
| | <10% | | | >50% |
| | <10% | | >37% | >40% |
| | <10% | | >40% | >20% |
| 3D CAD/Map/Business graphic | <15% | | >65% | |
| | | | >30% | >30% |
| | | >22% | >50% | |
| | | >30% | >20% | |
| | <12% | | >10% | >40% |
| Mixed content | all other distributions | | | |

Figure 6:
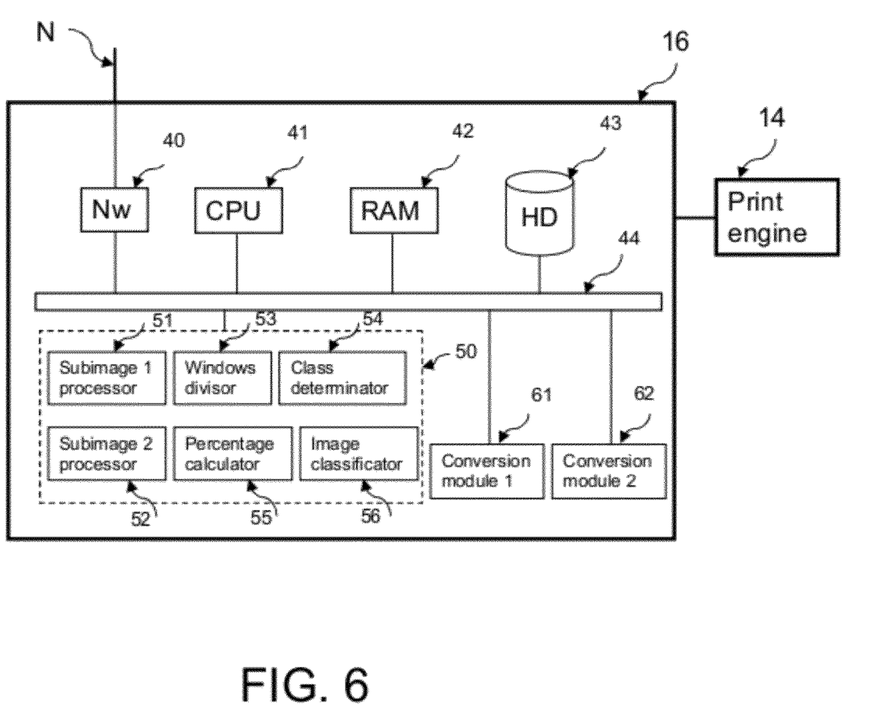
FIG. 6 is a computer system that is used in embodiments of the present invention.

FIG. 6 shows a computer system (16) that is configured to act as a controller for receiving print jobs through the network (N). The computer system (16) acts as the digital interface of the print engine (14) and is also called a digital front-end. The system comprises a central data bus (44) that couples to a network adapter (40), a central processing unit (41), a random access memory (42), where data is kept as long as the system is turned on, and a hard disk that comprises non-volatile memory. In this system, modules are provided that are able to perform the methods as described earlier. The new modules are indicated by a box (50). Various conversion modules for converting different types of originals to print data are provided. In this system, they are automatically selected at the time an original is offered in a print job for output on the print engine (14). From the rasterized image at least two sub-images are derived by the sub-image processors (51, 52). These original image and the sub-images are divided in windows by the windows divisor module (53). For every window, a class is determined in a processor (54). After determining the percentage of windows belonging to a class in the percentage calculator (55), the image classificator (56) determines the image type of the original, which is the basis for selecting one or the other conversion module (61, 62). These modules are, e.g. implemented by field programmable gate arrays (FPGA).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for generating print data for a digital color image having pixels, the method comprising the steps of:
   determining for each pixel in the digital color image a value of a characteristic feature; and
   selecting an available conversion method for processing the pixels of the digital color image into print data, based on the determined characteristic values of the pixels, wherein said step of selecting comprises the steps of:
   deriving from the digital color image at least two sub-images, wherein in each of the at least two sub-images, the pixels have a value that represents another characteristic feature of the pixels in the digital color image;

establishing a class for each pixel in the digital color image by combining the at least two values of the corresponding pixels in the sub-images; and selecting a conversion method based on a statistic of classes of the pixels in the digital color image.

2. The method according to claim 1, wherein the at least two sub-images comprise a gradient sub-image, in which each pixel indicates a local variation in a value of a pixel relative to a value of at least one pixel located in a neighborhood of said pixel, and a non-uniformity sub-image, in which each pixel determined to be comprised in a uniform area is provided with a predetermined value.

3. The method according to claim 1, wherein the digital color image is divided into a number of windows, each window comprising a number of pixels, and the step of establishing a class for each pixel in the digital color image is based on establishing a class for each window in the digital color image by combining average values of the pixels in corresponding windows of the at least two sub-images.

4. The method according to claim 3, wherein the step of selecting a conversion method comprises the steps of determining a number of windows for each class relative to the total number of windows, forming a fraction, and comparing this fraction to a threshold.

5. The method according to claim 4, wherein the threshold for selecting a conversion method is established by processing a number of preselected images in a learning mode.

6. A color printer system comprising:
a controller configured to schedule and interpret print jobs; and
a printing engine configured to mark support material,
wherein the controller comprises:
modules configured to generate print data for a digital color image having pixels;
at least two modules configured to process the digital color image into sub-images;
a module configured to establish a class for each pixel in the digital color image by combining the at least two values of the corresponding pixel in the sub-images; and
a module configured to select a conversion method based on a statistic of classes of the pixels in the digital color image.

7. The color printer system according to claim 6, wherein the controller further comprises a module configured to divide the digital color image into a number of windows and corresponding windows in the at least two sub-images.

8. The color printer system according to claim 7, wherein the controller further comprises a module configured to calculate a number of windows for each class relative to the total number of windows.

9. The color printer system according to claim 8, wherein the controller further comprises a module configured to establish thresholds in a learning mode, the thresholds being used by the module for selecting a conversion method.

* * * * *